United States Patent [19]

Skobranek

[11] 4,424,413
[45] Jan. 3, 1984

[54] CIRCUIT FOR CONVERTING A BINARY INPUT SIGNAL INTO A TELEGRAPH SIGNAL

[75] Inventor: Norbert Skobranek, Munich, Fed. Rep. of Germany

[73] Assignee: Siemens Aktiengesellschaft, Berlin & Munich, Fed. Rep. of Germany

[21] Appl. No.: 303,096

[22] Filed: Sep. 17, 1981

[30] Foreign Application Priority Data

Sep. 24, 1980 [DE] Fed. Rep. of Germany ....... 3035999

[51] Int. Cl.³ .................. H04L 15/00; H04B 1/02
[52] U.S. Cl. .................. 178/17 R; 178/63 B; 375/36
[58] Field of Search ............ 178/26 R, 70 F, 70 TS, 178/79, 17 R, 63 B; 375/36

[56] References Cited

U.S. PATENT DOCUMENTS 4,327,249 4/1982 Rademaker ................. 375/36 X

FOREIGN PATENT DOCUMENTS 2721514 8/1978 Fed. Rep. of Germany .
1357979 6/1974 United Kingdom .

Primary Examiner—Stafford D. Schreyer
Attorney, Agent, or Firm—Hill, Van Santen, Steadman & Simpson

[57] ABSTRACT

A circuit for converting a binary input signal into a telegraph signal has constant current sources which respectively include at least one transistor with a separate bias voltage source for each transistor. The base of at least one of the transistors is connected to an input signal source. Operating voltages of opposite polarities are connected to the constant current sources, which are in turn connected to a telegraph signal output. In order to minimize the power necessary to drive the circuit, the transistors in the constant current sources, together with the respective bias voltage sources, are respectively disposed only between an operating voltage terminal and the telegraph signal output.

11 Claims, 5 Drawing Figures

CIRCUIT FOR CONVERTING A BINARY INPUT SIGNAL INTO A TELEGRAPH SIGNAL

BACKGROUND OF THE INVENTION

1. Field of the Invention

The present invention relates to circuits and devices for converting a binary input signal into a telegraph signal.

2. Description of the Prior Art

A circuit for converting a binary input signal into a telegraph signal which employs constant current sources, each constant current source having at least one transistor with a separate bias voltage source, and having an input signal supply device which applies an input signal to the base of at least one of the transistors is known from German AS No. 27 21 514. In that device, the operating voltages for the constant current sources are of opposite polarity and a telegraph signal output is connected to the constant current sources. Each of the constant current sources has a transistor which has its collector-emitter segment connected between an operating voltage terminal and the telegraph signal output. The bias voltage means for the transistors in the constant current sources respectively include Zener diodes connected to the bases of the transistors, however, only one Zener diode is conducting at any time. The current for the Zener diodes and the control current for the respective transistor flows in a separate control circuit, which requires a relatively high drive power outlay. The requirement for drive power is added to the normal power requirement necessary for the emission of telegraph signals. If, for example, the Zener diodes conduct a current of 5 milliamps at respective operating voltages of ±60 volts, the operating voltage sources of this known circuit have a drive power load of between 300 milliwatts and 900 milliwatts. The drive power must be obtained from the operating voltage sources in addition to the power which is required for the telegraph signal which is to be emitted. This power requirement is even higher when the known circuit described above is doubled, as is required, for example, for ground-fault proof single-current operation. For this type of operation, the line carrying the telegraph signals is connected to the mutually corresponding outputs of two circuits of the type described above, whereby only one of the two current sources is respectively keyed in the two circuits. This arrangement can be described as one in which the telegraph signal line is disposed in a bridge circuit consisting of constant current sources.

A keying circuit for operating the above-described arrangement for the emission of telegraph characters in the form of single-current or double-current signals with a constant output current which is independent of the load resistance is known from German AS No. 21 32 616, corresponding to British Pat. No. 1,357,979. In this known circuit, the input voltage is supplied to a transistor which is connected as an emitter follower. A load resistor is connected to the collector of this transistor. An emitter resistor is connected in the emitter circuit of the transistor and a Zener diode is connected parallel to the base-emitter segment of the transistor. The Zener diode limits the input voltage to the base of the transistor to the value of the Zener voltage in the conductive state of the transisor. This keying circuit, representing a constant current source, is employed for double-current operation in a push-pull transistor circuit in which separate transistors are provided in the control circuit for the transistors of the constant current sources. Only one of the separate transistors is driven into a conductive state at a time, while the other transistor is in a non-conducting state. This conventional circuit arrangement also has a relatively high power requirement which results from the fact that the Zener diodes conduct a current which is obtained from the operating voltage sources. For an operating voltage of ±60 volts, a control power of approximately 300 milliwatts is required in this circuit given a 5 milliamp current requirement for operation of the Zener diodes when the circuit arrangement functions in a double-current operation. For single-current operation, that is, the employment of two corresponding circuits of the type described above, a drive power requirement of 600 milliwatts exists.

SUMMARY OF THE INVENTION

It is an object of the present invention to provide a circuit for converting a binary input signal into a telegraph signal which employs constant current sources having at least one transistor with separate bias voltage sources, which has significantly decreased drive power requirements separately loading the operating voltage sources for the transistors.

The above object is inventively achieved in a circuit for converting a binary input signal into a telegraph signal of the type described above wherein the transistors of the constant current sources and the respective separate bias voltage means, are disposed only between one operating voltage terminal and the telegraph signal output.

This circuit structure offers the advantage that the drive power required for the bias voltage means do not load the operating voltage sources in addition to the output power which is required therefrom for emitting the telegraph signals. The currents available for the bias voltage means do not flow in separate circuits, but rather flow via the telegraph signal output through which the telegraph signal current must flow. This means that the associated control currents comprise a part of the telegraph signal currents. The inventive circuit disclosed and claimed herein can be relatively simply and economically realized as a dc telegraphy transmission circuit for single- or double-current operation. The inventive circuit can be operated at 120 volts/40 milliamps or at ±48 to 80 volts/20 milliamps with automatic current control.

Each bias voltage means is preferably formed by a separate auxiliary constant current source which contains at least one transistor with a bias voltage generating device connected in its base circuit. This feature offers the advantage of a particularly simple circuit realization of the bias voltage means.

It is further preferable that the transistors for each constant current source and for the auxiliary constant current source connected thereto are comprised of transistors of opposite conductivity types which are connected to one another at their respective bases and collectors to form a circuit analogous to a four-layer semiconductor device. This arrangement provides the further advantage that the constant current sources together with the auxiliary constant current sources operating as the bias voltage means can be keyed in common in a relatively simple manner.

The bias voltage generating devices mentioned above are preferably formed by means of Zener diodes. This is in keeping with the above-described advantages of a particularly low circuit outlay. The bias voltage generating devices may also be formed, however, by means of diode paths consisting of at least two diodes connected in parallel with opposite polarity. This arrangement has the advantage of a particularly favorable operation for the overall circuit arrangement as is described in greater detail below. These diode paths which form the bias voltage generating device can be formed by transistors connected in a Darlington drive arrangement, which maintains the advantage of a relatively low circuit outlay.

More particularly, the transistor of a first constant current source is connected at its emitter to the telegraph signal output, and the transistor of a second constant current source is connected at its collector to the telegraph signal output. This offers the advantage that transistors of the same conductivity type, thus having identical properties, can be employed for the constant current sources. This also means that the drive of the transistors can be relatively simply controlled such that when one transistor is conducting the other transistor will be in a non-conducting state.

A Zener diode, which is connected to the base of the transistor in the first constant current source, is also utilized to form the connection between the collector of the transistor in the second constant current source and the telegraph signal output. This offers the advantage of exploiting the forward voltage drop at the Zener diode in the conductive state of the transistor in the second constant current source for insuring blockage of the transistor of the first constant current source connected to this Zener diode.

The transistor of the auxiliary constant current source associated with the second constant current source may be connected at its emitter directly to the telegraph signal output through an ohmic resistor. This arrangement offers the advantage that no additional Zener diode or diode path is necessary for the voltage generating device of that auxiliary constant current source.

In order to assure voltage separation of the input signal terminals and the telegraph signal output, an opto-coupler is preferably employed as the input signal supply device. This additionally provides a relatively simple means for supplying the input signal and because of the power requirements of the circuit disclosed herein, a particularly economic opto-coupler can be employed, that is, an opto-coupler with a relatively low collector-emitter voltage.

For single-current operation with pole reversal, such as for exchange operation, the above-described circuit can be utilized in duplicate and the two leads of a transmission line can be respectively connected to the two telegraph signal outputs of the two circuits. This results in a particularly reliable single-current operation which, in contrast to single-current operation employing the above-described conventional circuits, has significantly low power requirements for the operating voltage sources.

DESCRIPTION OF THE PREFERRED EMBODIMENTS

Figure 1:
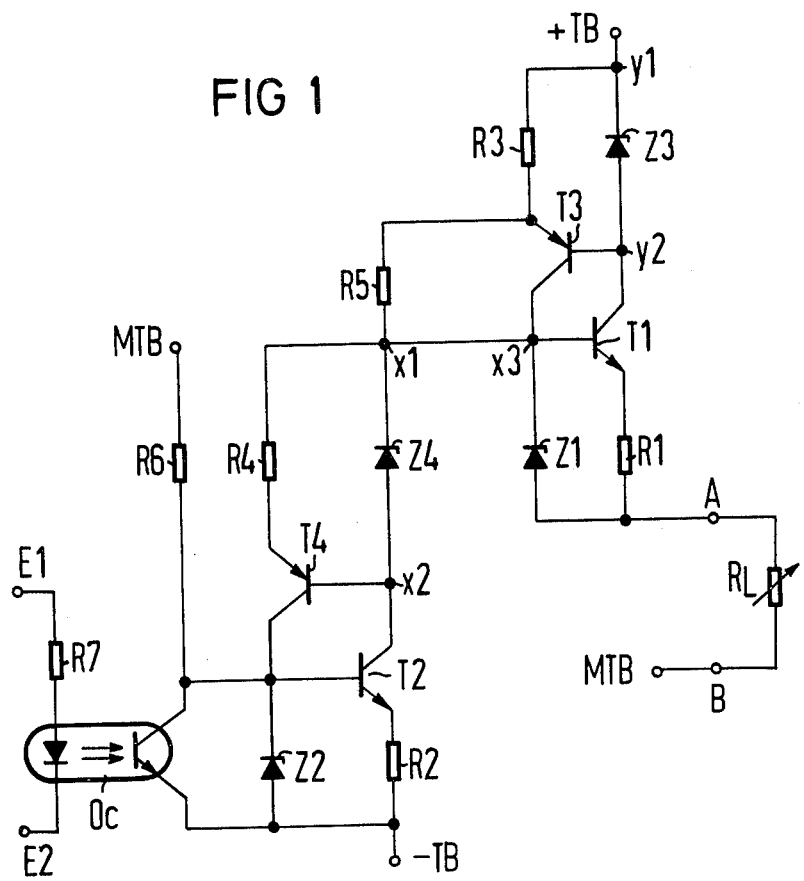
FIG. 1 is a circuit diagram of a dc telegraph transmission circuit for converting binary input signals into telegraph signals constructed in accordance with the principles of the present invention.

A circuit for converting binary input signals into a telegraph signal constructed in accordance with the principles of the present invention is shown in FIG. 1 which includes two constant current sources. A first of the constant current sources includes a transistor T1, and a second of the constant current sources includes a transistor T2. The transistors T1 and T2 are of the same conductivity type, and in the exemplary embodiment of FIG. 1 are npn transistors.

The first constant current source, containing the transisor T1, further comprises a resistor R1 connected to the emitter of the transistor T1 and a Zener diode Z1 connected to the base of the transistor T1. The polarity of the Zener diode, as connected in FIG. 1, is such that when the diode Z1 is forward conducting, a negative voltage will be applied to the base of the transistor T1 so that the transistor T1 will be in a non-conducting state.

The constant current source including the transistor T2 similarly comprises a resistor R2 connected to the emitter of the transistor T2 and a Zener diode Z2 connected to the base of the transistor T2. The Zener diode Z2 is also connected so that when the diode Z2 is forward conducting the transistor T2 will be in a non-conducting state. The Zener voltages of the Zener diodes Z1 and Z2 are selected, in combination with consideration of the emitter resistances for the transistors T1 and T2 which determine the emitter voltages thereof, such that the transistors T1 and T2 will supply the currents required for proper operation of the circuit in their conductive states.

The transistors T1 and T2 in the two constant current sources described above each have separate bias voltage means by which the required bias voltages for those transistors are made available. In the embodiment shown in FIG. 1, these bias voltage means are also formed by constant current sources which, in order to distinguish those constant current sources from the constant current sources containing the transistors T1 and T2, will be identified as auxiliary constant current sources. The auxiliary constant current source associated with the constant current source containing the transistor T1 includes a transistor T3, a resistor R3 connected to the emitter of the transistor T3, and a Zener diode Z3 connected to the base of T3. The other auxiliary constant current source shown in FIG. 1, associated with the second constant current source containing the transistor T2, comprises a transistor T4 with a resistor R4 connected to its emitter and a Zener diode Z4 connected to its base.

As is shown in FIG. 1, the transistors T3 and T4 are also of the same conductivity type. The conductivity type for the transistors T3 and T4 is, however, opposite to the conductivity type of the transistors T1 and T2.

The transistors T1 and T2 in the constant current sources and the transistors T3 and T4 in the associated auxiliary constant current sources are interconnected with their respective collectors and bases in such a manner that an arrangement analogous to a four-layer semiconductor device is achieved.

The Zener diodes Z3 and Z4 are operated in the Zener range for the collector currents of the respectively associated constant current source transistors T1 and T2. The Zener voltages for the Zener diodes Z3 and Z4 are selected in a manner analogous to that already described for the Zener diodes Z1 and Z2.

The two circuit portions, each consisting of a constant current source and an auxiliary constant current source serving as a bias voltage means, are directly connected to one another at two circuit nodes x1 and x3. A resistor R5, which is a high impedance starting resistor, is interconnected between the circuit node x1 and the emitter of the transistor T3.

The transistors T1 and T2 of the constant current sources, together with their respective bias voltage means (the auxiliary constant current sources respectively containing the transistors T3 and T4) are each connected in series between a respective operating voltage terminal and a telegraph signal post A. In the configuration shown in FIG. 1, the constant current source including the transistor T1 is supplied with an operating voltage +TB and the other constant current source containing the transistor T2 is supplied with an operating voltage −TB. The constant current source with the transistor T1 is directly connected to the telegraph signal post A. The other constant current source, with the transistor T2, is connected to the telegraph signal post A via the Zener diode Z1, which is connected to the base of the transistor T1. One end of a transmission line, indicated by means of a variable load resistance $R_L$, is connected to the telegraph signal post A. The other end of the transmission line is referenced at B and may be connected, for example, to another circuit corresponding to the circuit shown in FIG. 1 at the telegraph signal output of the other circuit, or may be connected to an operating voltage terminal MTB which is the center terminal for two operating voltage sources which supply the voltages +TB and −TB shown in FIG. 1. The load resistance $R_L$ also includes a telegraph signal receiver.

The circuit shown in FIG. 1 further includes an opto-coupler Oc having a diode, representing a light-emitting element, which is connected through a protective resistor R7 to input terminals E1 and E2. A binary input signal is supplied to the input terminals E1 and E2 which is to be converted into a telegraph signal. The collector-emitter segment of the transistor in the opto-coupler Oc is connected in parallel to the Zener diode Z2. The collector of the transistor in the opto-coupler Oc is connected through a collector resistor R6 to a circuit point which is the same circuit point to which the transmission line represented by $R_L$ is also connected, such as the terminal MTB. Because a positive voltage exists at the circuit point MTB in comparison to the circuit terminal at which the voltage −TB is supplied, the collector-emiter voltage of the transistor in the opto-coupler Oc is limited in its non-conducting state by the Zener voltage of the Zener diode Z2. Because of this current limiting feature, the opto-coupler Oc can be a relatively inexpensive opto-coupler.

The operation of the circuit shown in FIG. 1 is as follows. The binary input signal supplied to the inputs E1 and E2 may exhibit one of two possible levels. During the presence of one of these input signal levels the opto-coupler Oc is driven such that its transistor is in a conducting state, and the transistor in the opto-coupler Oc is in a non-conducting state during the presence of the other input signal level. If the transistor of the opto-coupler Oc is conducting, the transistor T2 will be non-conducting, so that the transistor T4 is also non-conducting. This results in a control potential at the circuit node x3 through the starting resistor R5 such that the transistor T1 is in a conducting state. The transistor T3 is also at this time conducting. A current of, for example, 5 milliamps flows through the Zener diode Z1 via the bias voltage means including the transistor T3. This current flows from the operating volage terminal +TB through the transistor T3 and the Zener diode Z1 to the telegraph signal output A and thus through the transmission line $R_L$. The constant current which the transistor T1 generates via its collector-emitter segment is also added to this current. If a total current of, for example, 40 milliamps is required at the telegraph signal output A, the transistor T1 of the constant current source need only supply a current of 35 milliamps. The relatively small base currents present in the circuit were not considered for purposes of the above discussion.

The currents of 35 milliamps and 5 milliamps are taken from the operating voltage terminal +TB, and both currents flow in common via the transmission line $R_L$. This means that no additional drive power need be available for the transistor T1 of the constant current source, that is, no additional power is required above that which must be expended in order to emit the appropriate telegraph signal. The relatively insignificant power draw of the opto-coupler Oc in the conductive state is not a significant factor in the above power requirements. If, for example, one assumes a current of 0.1 milliamps through the resistor R6 and further assumes a voltage of 0 volts at the circuit point MTB and a voltage of −60 volts at the circuit point −TB, an additional drive power outlay of 6 milliwatts results.

When the opto-coupler Oc is driven such that its transistor is non-conducting, the base of the transistor T2 is at a positive potential with respect to the emitter of transistor T2. The transistor T2 and the transistor T4 are thus in a conducting state. Current thus flows from the operating voltage terminal MTB connected at B across the transmission line $R_L$, the Zener diode Z1 which is forward conducting, as well as across the collector-emitter segments of the transistors T2 and T4 to the operating voltage terminal −TB. As a result of the operation of the Zener diode Z1 in the forward conducting mode, a voltage which is approximately 0.7 volts more negative than the voltage at the telegraph signal output A is present at the circuit node x3. The transistors T1 and T3 are thus maintained in non-conductive states.

The current consumed by the conducting transistors T2 and T4 through the transmission line $R_L$ is divided into the current which flows through the bias voltage means for the transistor T2, which is for example, 5 milliamps, and the current which flows through the collector-emitter segment of that constant current source transistor T2, which is for example, 35 milliamps. The transistor T2 receives the current which flows through the resistor R5. Apart from the small drive power of, for example, 6 milliwatts which results thereby, the transistor arrangement with the transistors T2 and T4 requires only the drive power of, for example, 6 milliwatts drawn by the resistor R6, for a total of 12 milliwatts.

Figure 2:
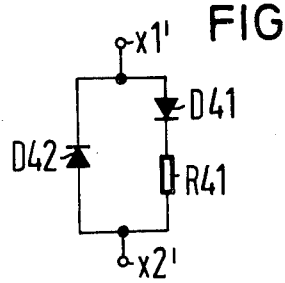
FIG. 2 is a further embodiment of a bias voltage generating device which can be employed in the circuit of FIG. 1.

When the transistor of the opto-coupler Oc again becomes conducting, it must receive the current from the transistor T4 for the bias voltage means, that is, for the Zener diode Z2, until complete blockage of the transistor T2 occurs. This current, for example, amounts to 5 milliamps. In order to eliminate the need for such a current acceptance capability on the part of the opto-coupler Oc, the Zener diode which is connected between the circuit nodes x1 and x2 can be replaced by the circuit shown in FIG. 2. The circuit nodes x1' and x2' shown in FIG. 2 are connected to the nodes x1 and x2 in FIG. 1. The circuit shown in FIG. 2 consists of a series connected diode D41 and resistor R41 and a further diode D42 connected in parallel therewith such that the polarity of the diode D42 is opposite to that of the diode D41. The resistor R41 is selected such that a voltage drop of 0.7 volts occurs given a current flow of, for example, 35 milliamps through the diode D41 in the forward direction. When the circuit shown in FIG. 2 is employed in the circuit shown in FIG. 1, at the beginning of the blocking of the transistor T2, the reference voltage for the transistor T4, that is, the voltage between the circuit nodes x1 and x2, will decrease. The current flowing through the collector-emitter segment of the transistor T4, which is to be received by the transistor in the opto-coupler Oc, thus similarly decreases. The use of the circuit shown in FIG. 2 in the circuit of FIG. 1 thus promotes blocking of the transistor arrangement and at the same time decreases the current acceptability demands made on the opto-coupler Oc.

Figure 3:
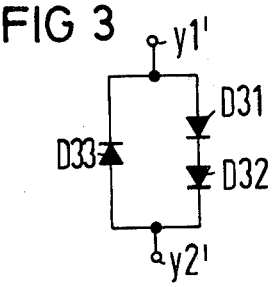
FIG. 3 is another embodiment of a bias voltage generating device which can be employed in the circuit of FIG. 1.

Another substitution may be made to the circuit of FIG. 1, that being substitution of the circuit shown in FIG. 3 between the circuit nodes y1' and y2' for the Zener diode Z3, connected between circuit nodes y1 and y2 in FIG. 1. The circuit of FIG. 3 consists of two series-connected diodes D31 and D32 of the same polarity connected in parallel with a further diode D33 so that the polarity of the diode D33 is opposite to that of the other two diodes. Use of the circuit of FIG. 3 in the circuit shown in FIG. 1 decreases the reference voltage for the transistor T3 and thus increases the range of adjustment of the constant current sources encompassing the transistors T1 and T3 and thus also increases the bridgeable line length of the transmission line.

Figure 4:
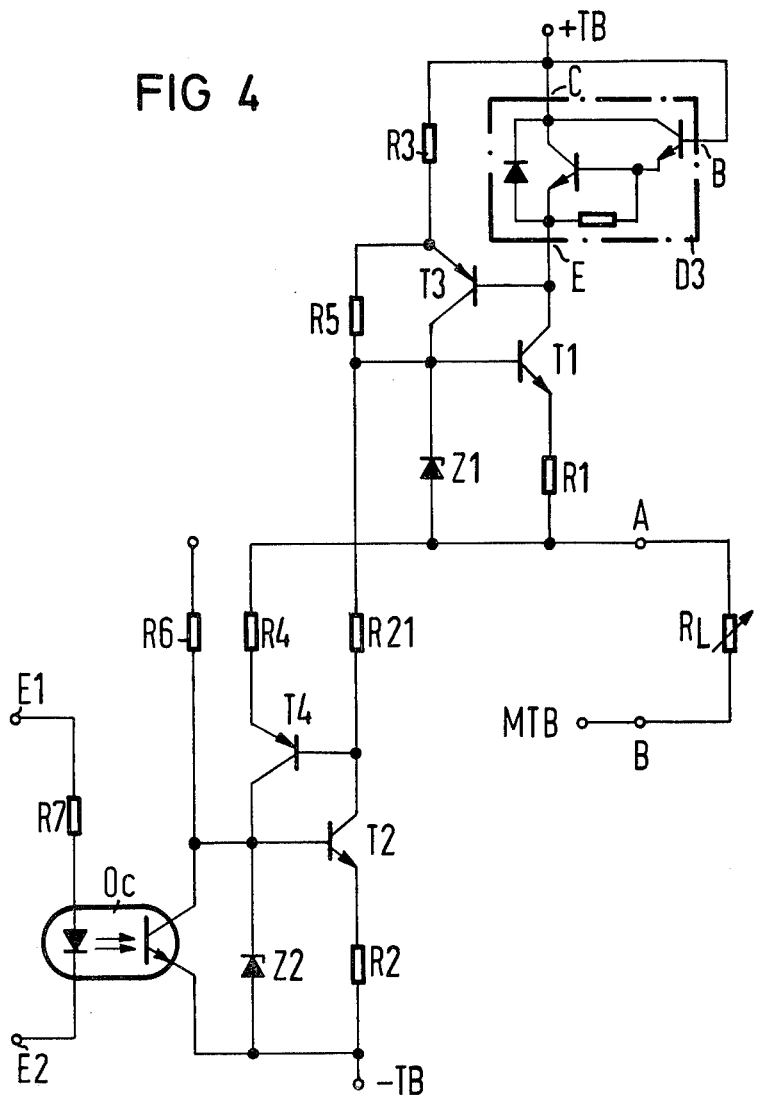
FIG. 4 is a second embodiment of the circuit shown in FIG. 1.

A further embodiment of the invention is shown in FIG. 4 which differs from the circuit shown in FIG. 1 in that the resistor R4 which is connected to the emitter of the transistor T4 is not connected to the base of transistor T1, as in FIG. 1, but is instead directly connected to the telegraph signal output A. In the embodiment of FIG. 4, the forward voltage of the Zener diode Z1 is thus simultaneously exploited as part of the reference voltage for the transistor T4. By the addition of a further resistor R21 in the circuit shown in FIG. 4, the advantages obtained with the substitute circuit shown in FIG. 2 can be achieved as well. The Zener diode Z1 and the resistor R21 in FIG. 4 perform the same function as the diode D41 and the resistor R41 shown in FIG. 2, and the diode D42 shown in FIG. 2 need not be present in the configuration shown in FIG. 4. Proper operation of this configuration, however, requires that the Zener voltage of the Zener diode Z1 be smaller than the admissible base-emitter switching voltage for the transistor T4.

A further difference between the circuits shown in FIGS. 4 and 1 is that the Zener diode Z3 of FIG. 1 has been replaced by a Darlington transistor drive arrangement D3. The conventional internal structure of the Darlington transistor arrangement D3 is shown by unreferenced elements within the dot and dash lines in FIG. 4 and operates equivalent to a single transistor having a base B, an emitter E and a collector C. As is shown in FIG. 4, the base B and the collector C of the Darlington transistor arrangement D3 are connected to each other and are further connected to the operating voltage +TB. The emitter E of the Darlington transistor arrangement D3 is connected to that circuit node at which the collector of the transistor T1 and the base of the transistor T3 are connected in common. The Darlington transistor arrangement D3 performs the same functions as the diode arrangement shown in FIG. 3.

Figure 5:
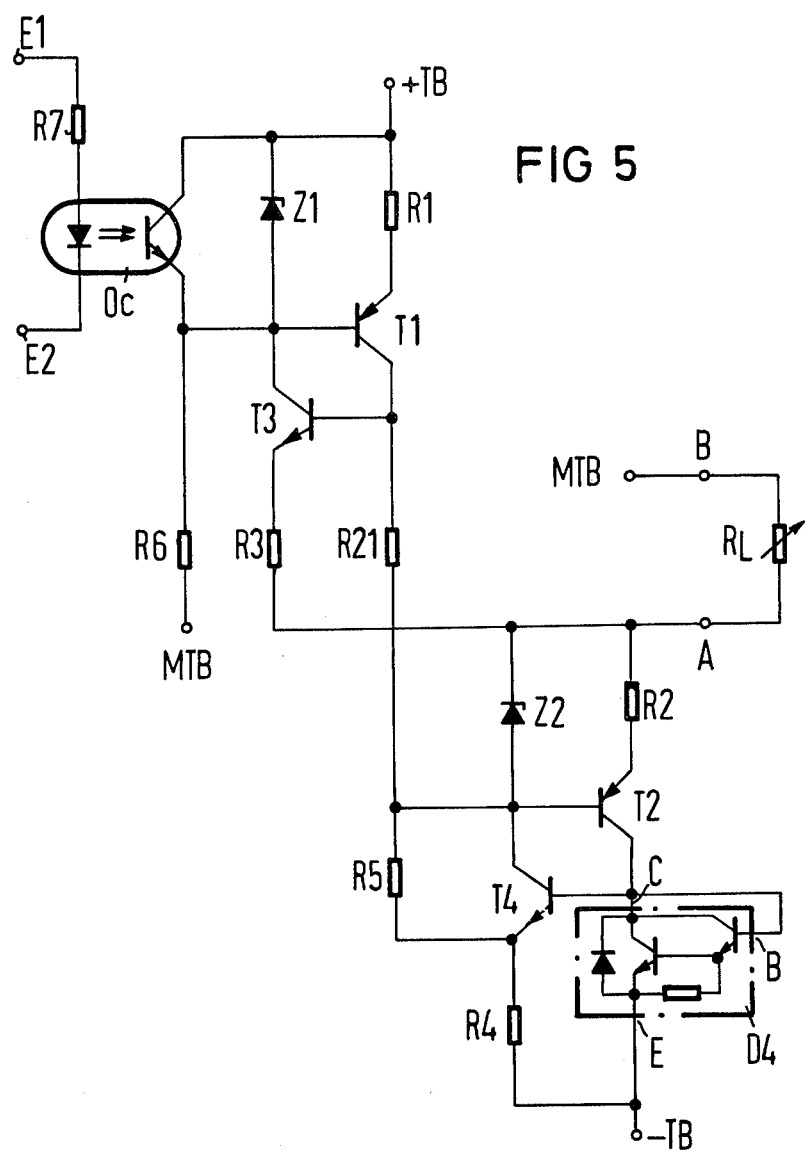
FIG. 5 is an embodiment of the circuit shown in FIG. 4 employing transistors of opposite conductivity types to those shown in FIG. 4.

Another embodiment of the invention is shown in FIG. 5, which corresponds to the circuit shown in FIG. 4 in which the transistors in the constant current sources and the auxiliary current sources are of opposite conductivity types to those same transistors shown in FIG. 4. In the circuit shown in FIG. 5, the transistors T1 and T2 are of a pnp conductivity type and the transistors T3 and T4 are of an npn conductivity type. The remainder of the circuit shown in FIG. 5 coincides with the circuit of FIG. 4 and the operating principles and manner of functioning of the two circuits are identical.

In all of the circuits shown in FIGS. 1, 4 and 5 a binary input signal is converted into a telegraph signal having a signal current which flows in one of two directions over the transmission line $R_L$. The described circuits thus function as dc telegraph transmission circuits for double-current signals. The circuits can, however, be employed to emit only single-current signals by the use of only one of the constant current sources together with its associated auxiliary constant current source to supply the binary signal input to the constant current source via an input signal supply circuit and to connect it to the transmission line at the output side via the telegraph signal output. In this case, the advantages discussed above relating to the drive power outlay will be completely retained, however, it is also possible to realize a dc telegraph transmission circuit for single-current signals such that the circuit as shown in any one of FIGS. 1, 4 or 5 is provided in duplicate and the transmission line $R_L$ is then connected to the two corresponding telegraph signal outputs of the two circuit arrangements. In this situation, the two circuits connected to the transimission line $R_L$ are driven in complimentary fashion, as described earlier. Such a circuit design can be employed to render a pole reversal of the transmission line possible for exchange operation as well as in those instances requiring a short-circuit-proof and a ground-fault-proof operation, that is, an operation in which a short circuit of the transmission line or a grounded short, that is a short to the circuit point MTB, will not have any debilitating effects on the overall circuit arrangement, particularly on the operating voltage sources and the transmission line $R_L$.

Although modifications and changes may be suggested by those skilled in the art it is the intention of the inventor to embody within the patent warranted hereon all changes and modifications as reasonably and properly come within the scope of his contribution to the art.

I claim as my invention:

1. A circuit for converting a binary input signal into a telegraph signal comprising:

first and second constant current sources each including a transistor,
said constant current sources being connected respectively at terminals to operating voltages of opposite polarity;
two bias voltage means each having a plurality of bias voltage elements for respectively biasing the transistors in said constant current sources;
an input signal supply device for receiving said binary input signal and supplying said input signal to the base of at least one of said transistors in said constant current sources; and
a telegraph signal output to which each of said constant current sources are connected,
the transistor in said first constant current source and the bias means associated therewith being completely disposed between one of said operating voltage terminals and said signal output,
and the transistor in said second constant current source and the bias means associated therewith being completely disposed between the other of said operating voltage terminals and one of the bias voltage elements of said bias voltage means associated with said first constant current source,
said one of said bias voltage elements being connected to said signal output.

2. The circuit of claim 1 wherein each bias voltage means is a separate auxiliary constant current source, each auxiliary constant current source contaiing one transistor and a bias volage generating device therefor, said transistor in said separate constant current source being connected to the base of the transistor in the associated one of said first and second constant current sources.

3. The circuit of claim 2 wherein the transistors in each said constant current source and in the separate constant current source connected thereto are of opposite conductivity types and are connected to each otheer at their respective bases and collectors.

4. The circuit of claim 2 wherein said bias voltage generating device is a Zener diode.

5. The circuit of claim 2 wherein said bias voltage generating device consists of at least two diodes connected in parallel with opposite polarities.

6. The circuit of claim 2 wherein said bias voltage generating device is a Darlington drive transistor arrangement.

7. The circuit of claim 1 wherein the transistor in said first constant current source is connected at its emitter to the telegraph signal output and the transistor of said second constant current source is connected at its collector to said telegraph signal output.

8. The circuit of claim 7 wherein a Zener diode is connected to the base of the transistor in said first constant current source and wherein said Zener diode is interconnected between the collector of said transistor in said second constant current source and said telegraph signal output.

9. The circuit of claim 2 wherein the transistor in the auxiliary constant current source connected to said second constant current source is connected to said telegraph signal output through an ohmic resistor.

10. The circuit of claim 1 wherein said input signal supply device is an opto-coupler.

11. The circuit of claim 1 further comprising:
third and fourth constant current sources each containing one transistor, said third and fourth constant current sources being respectively connected at second terminals to operating voltages of opposite polarities;
two additional bias voltage means for respectively biasing said third and fourth constant current sources;
a second input signal supply device for supplying an input signal to the base of at least one of the transistors in said third and fourth constant current sources; and
a second telegraph signal output to which said third and fourth constant current sources are connected,
said transistor in said third and fourth constant current sources and the respective additional bias voltage means connected thereto being interconnected only between one of said second operating voltage terminals and said second telegraph signal output,
said telegraph signal output and said second telegraph signal output being interconnected by a transmission line for single-current signal operation.

* * * * *